INVENTORS
ROBERT M. HAYES
ALFRED M. NELSON
BY Ellsworth R. Roston
ATTORNEY

R. M. HAYES ET AL 2,842,362

CARD PROCESSING APPARATUS

Filed Oct. 3, 1955

INVENTORS
ROBERT M. HAYES
ALFRED M. NELSON
BY
Ellsworth R. Roston
ATTORNEY

July 8, 1958 R. M. HAYES ET AL 2,842,362
CARD PROCESSING APPARATUS
Filed Oct. 3, 1955 4 Sheets-Sheet 4

INVENTORS
ROBERT M. HAYES
ALFRED M. NELSON
BY Ellsworth R. Roston
ATTORNEY

# United States Patent Office 2,842,362
Patented July 8, 1958

2,842,362

CARD PROCESSING APPARATUS

Robert M. Hayes, Los Angeles, and Alfred M. Nelson, Redondo Beach, Calif., assignors to The Magnavox Company, Los Angeles, Calif., a corporation of Delaware Application October 3, 1955, Serial No. 538,111

19 Claims. (Cl. 271—3)

This invention relates to apparatus for processing a plurality of information cards. More particularly, the invention relates to apparatus for obtaining a transfer of the cards from a drum to a stack at particular times and for obtaining a transfer of the cards from the stack to the drum at other times.

In recent years, digital techniques have been used for a wide variety of purposes, especially in the field of computers and data processing systems. In such fields as data processing systems, digital techniques have been used to store a wide variety of information and assimilate the information for subsequent use. For example, digital techniques have been used in a department store to hold and use information relating to all of the different types of merchandise sold in the store. When sales are made, such information as the sale price and the types of merchandise sold are recorded. This provides a convenient way of determining the total sales and the amount of merchandise left in each category so that such matters as prices and re-ordering of merchandise can be quickly made available at all times.

In one type of data processing system, the information has been stored in a plurality of cards. Each card is provided with a plurality of positions for storing bits of information. Since as many as millions of bits of information may be required in a data processing system, thousands of cards often have had to be used. The cards are stored in a stacked relationship and are removed in sequence for movement on a drum or a plurality of drums. By removing the cards in sequence, all of the information in the various cards is made available for use. After being used, the cards are stacked in an order corresponding to their original relationship. In this way, the cards are made available for subsequent use.

Until now, the apparatus for transferring cards from a first stack to a drum has had to be separate from the apparatus for transferring the cards from the drum to a second stack. The reason for this has been that the same apparatus has not been able to operate on a reciprocal basis for transferring cards from a first stack to a drum or for transferring the cards back from the drum to the first stack. Since the same apparatus has not been able to operate on a reciprocal basis, the card processing system has had to be more complex and bulky than might sometimes have been desired.

This invention provides apparatus which can operate at particular times to transfer cards from a stack to a drum and which can operate at other times to feed the cards back from the drum to the stack. The invention includes a minimum number of components all of which operate in a positive and reliable manner. By using apparatus constituting this invention, cards can be transferred individually and in a sequential pattern from a first stack to a drum and subsequently transferred by the drum back to a second stack in the same order as their transfer to the drum. Since the cards are processed during their movement on the drum, a complete cycle of operation can be obtained with the use of only one drum.

An object of this invention is to provide apparatus which operates on a reciprocal basis either to transfer cards from a stack to a drum or to transfer cards from a drum to a stack.

Another object is to provide apparatus which is operative to obtain a sequential and orderly transfer of cards between a drum and a stack in accordance with the disposition of the cards in the stack or in accordance with the order in which the cards are moving on the drum.

A further object is to provide apparatus which requires a minimum number of components and a small amount of space to obtain a transfer of cards from a stack to a drum in one position of the components and to obtain a transfer of the cards from the drum to the stack in a second position of the components.

Still another object is to provide apparatus requiring only a single drum to obtain a transfer of cards from a first stack to the drum for processing of the cards during their movement on the drum and subsequently to obtain the transfer of the cards from the drum to a second stack.

Other objects and advantages will be apparent from a detailed description of the invention and from the appended drawings and claims.

In the embodiment of the invention shown in the drawings, a plurality of cards 10 are adapted to be disposed in stacked relationship such as in a stack generally indicated at 12. The stack 12 is formed by a pair of parallel walls 14 and 16 separated from each other by a distance slightly greater than the width of each card 10. The wall 16 is bent at a forward position as at 18 to extend toward suitable transport means such as a drum generally indicated at 20. The wall 18 extends toward the drum 20 in an oblique relationship with respect to the wall 16 and the periphery of the drum. The walls 14 and 16 rest on the top of a table 22 preferably having a flat surface. The bottom edges of the cards 10 also rest on the table 22. The faces of each card 10 are disposed in a substantially vertical plane extending in a lateral direction along the top of the table between the walls 14 and 16.

Each card 10 may be provided with a plurality of bits of digital information or other information. Each bit by itself or in combination with other bits represents information in digital form. This information may relate to numbers, alphabetic letters, combinations of numbers and letters (alphanumeric coding) or any other pertinent matter. The bits of information on each card may be disposed in rows, each of which extends in a lateral direction in Figure 1.

The bits of information may be provided in any suitable form on each card 10. For example, the information may be represented by holes or the absence of holes at the different positions. Preferably, the information is represented in magnetic form. In this form, magnetic fluxes of one polarity at a position may represent an indication of "0" or a false state and magnetic fluxes of an opposite polarity at a position may represent an indication of "1" or a true state.

Only one face of each card 10 may be magnetically polarized in the different information positions to represent various bits of binary information or both faces may be magnetically polarized in this manner. By polarizing both faces of each card, the number of cards required to store a particular amount of information can be substantially halved. The information on one side of the card will not interfere with the information on the other side of the card if the card is sufficiently thick.

Figure 2:
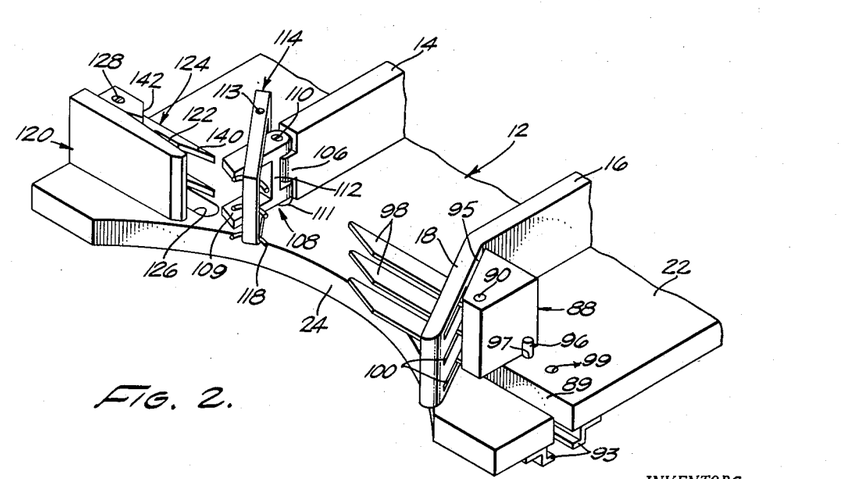
Figure 2 is an enlarged perspective view of the first apparatus shown in Figure 1 as seen from a position above, in front of and to the left of the apparatus.

The table 22 is provided with an arcuate configuration at its front end such as that indicated at 24 (best seen in Figure 2). In this way, the drum 20 can be disposed in contiguous relationship to the table 22 at every position along the arcuate portion 24. The drum 20 includes a pair of exterior plates 27 (Figure 3) defining a housing and having inwardly disposed lip portions 28 at their peripheries. A second pair of plates 30 are disposed within the compartment defined by the plates 27 and are suitably disposed in spaced relationship to the plates 27 as by spacers 32 mounted on studs 34. The studs 34 extend through the plates 27 and 30 at positions near the peripheries of the plates to maintain the plates in fixed position relative to one another. A plug 36 also extends into a threaded socket in the upper plate 27 at the annular center of the plate.

Figure 3:
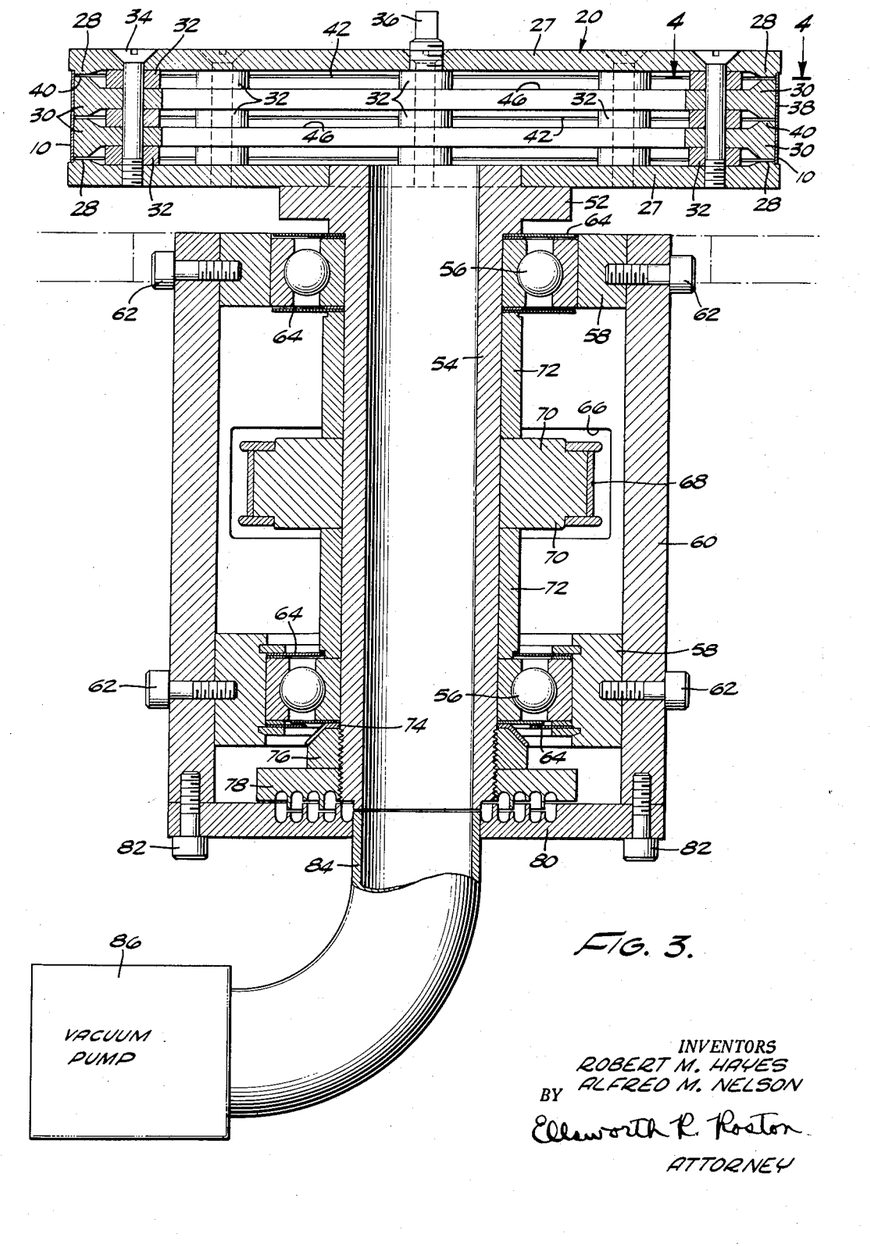
Figure 3 is an enlarged sectional view substantially on the line 3—3 of Figure 1 and illustrates in detail the drum shown in Figure 1.

The radius of the plates 30 is slightly less than that of the plates 27 by a distance corresponding substantially to the thickness of the cards 10 so as to form a neck portion 38 relative to the periphery of the plates 26. Each of the plates 30 has annular flange portions 40 extending axially from both faces of the plate 30 at the periphery of the plate. The flange portions 40 are so formed as to produce slots between the plates 30 and between the flanges on the plates 30 and the lip portions on the plates 27. The slots 42 communicate with suction passageways 46 formed between adjacent plates by the inclusion of the spacers 32.

The drum 20 is disposed against an annular collar 52 provided at one end of a hollow shaft 54. Bearings 56 are provided at opposite ends of the shaft 54. The inner races of the bearings 56 are mounted on the shaft and the outer races of the bearings are disposed against bushings 58 secured to a housing 60 as by studs 62. Seals 64 are disposed at opposite ends of the bearings to prevent the leakage of lubricating fluid from the bearings.

A hole 66 is provided in the housing 60 at a position between the bearings 56. The hole 66 is provided so that a belt 68 can extend into the housing and around a pulley 70. The pulley 70 is suitably positioned within the housing 60 as by sleeves 72 mounted on the shaft 54 between the bearings 56. In this way, the shaft 54 can be rotated by a suitable motor (not shown).

The bearings 56 and the sleeves 72 are maintained in fixed position on the shaft 54 as by a lock washer 74 and a nut 76. The nut 76 is adapted to be screwed on a threaded portion at the bottom of the shaft 54. A sealing disk 78 is also adapted to be screwed on the threaded portion of the shaft 54. The sealing disk 78 operates in conjunction with a bottom plate 80 to prevent movement of air between the interior of the housing 60 and the interior of the hollow shaft 54 upon a difference in pressure between the housing and the shaft.

The plate 80 is secured to the housing 60 as by studs 82. A hollow conduit 84 is in turn disposed as by a push fit within the plate 80. In this way, air can be exhausted from the hollow interiors of the shaft 54 and the conduit 84 as by a vacuum pump 86. Although the pump 86 is shown in block form in Figure 3, it should be appreciated that any suitable type of pump can be used.

Figures 7, 9:
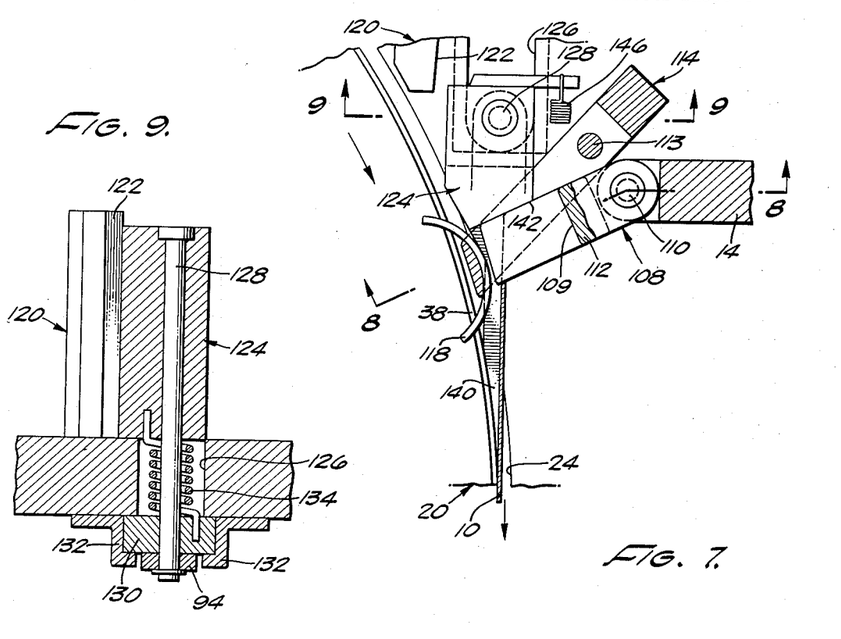
Figure 7 is an enlarged, fragmentary sectional view of certain members in the position of these members shown in Figure 6 and illustrates the operative relationship of these members with respect to the drum and an information card when the members have a disposition similar to that shown in Figure 6.
Figure 9 is a sectional view substantially on the line 9—9 of Figure 7 and illustrates in further detail the construction and relative disposition of certain members forming a part of the first apparatus and also illustrates the disposition of these members relative to the drum.

A card stop generally indicated at 88 is movable in a slot 89 extending laterally along the table 22 at a position near the front of the table. A stud 90 extends through the slot 89 into a guide block 91 (Figures 4 and 6) slidable in a pair of guide ways 93 (Figure 2). Each of the guide ways 93 extends along the slot 89 in substantially parallel relationship to the slot and on a different side of the slot. The stud 90 also extends into a slide bar 94 (Figures 4, 6 and 9) at a position below the guide block 91. The slide bar 94 extends laterally across substantially the full width of the table 22.

The slot 89, the guide block 91, the guide ways 93 and the slide bar 94 co-operate with the stop 88 to obtain an adjustable disposition of the stop laterally along the table 22. The lateral movement of the stop 88 toward the left in Figure 2 is limited by a surface 95 (Figures 2, 4 and 6) having an oblique configuration corresponding substantially to the oblique direction in which the wall portion 18 extends from the wall 16. In this position of the stop 88, a pin 96 (Figure 2) is adapted to fit in a first hole 97 in the table to prevent any movement of the stop laterally toward the right. A second hole 99 is also provided in the table 22 to receive the pin 97 when the stop 88 has been moved laterally to the right in Figure 2 to a position shown in Figure 6. This prevents the stop from moving toward the left in Figure 2.

The stop 88 has a plurality of fingers 98 which extend laterally to the left in Figure 2 through slots 100 in the wall portion 18. When the stop 90 is moved laterally to the left along the table 22, the fingers 98 are adapted to extend within the slots 42 in the drum 20 for reasons which will be described in detail subsequently. This may be best seen in Figure 4.

The fingers 98 are flanged rearwardly as at 102 to form a surface substantially parallel to the wall portion 16. The flanged portions 102 are formed at positions in the fingers 98 such that the flanged portions are disposed on the left side of the wall portion 18 when the stop 88 has been moved to its extreme left position along the table 22. In this extreme left position, the flange portion 102 in effect forms an extension of the wall portion 16.

Figure 8:
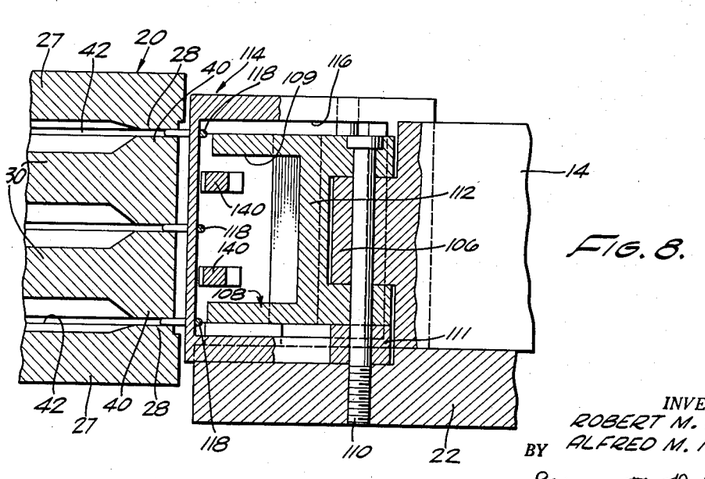
Figure 8 is a sectional view substantially on the lines 8—8 of Figure 7 and illustrates in further detail the construction and relative disposition of certain members forming a part of the first apparatus.

At its front end, the wall 14 is provided with a tongue 106 (Figures 2 and 8) adapted to fit within a groove in a pivotable retainer generally indicated at 108. The front portion of the retainer 108 is hollowed as at 109 for reasons which will be described in detail subsequently.

The retainer 108 is adapted to be supported on the tongue 106 in pivotable relationship to the wall portion 14 as by a screw 110 which extends through the retainer and the tongue portion 106 into a threaded socket in the table 22. A spacer 111 (Figure 8) may be disposed on the screw 110 between the retainer 108 and the table 22 to maintain the retainer in a proper position above the table in any pivotal disposition of the retainer.

Figures 4, 5, 6:
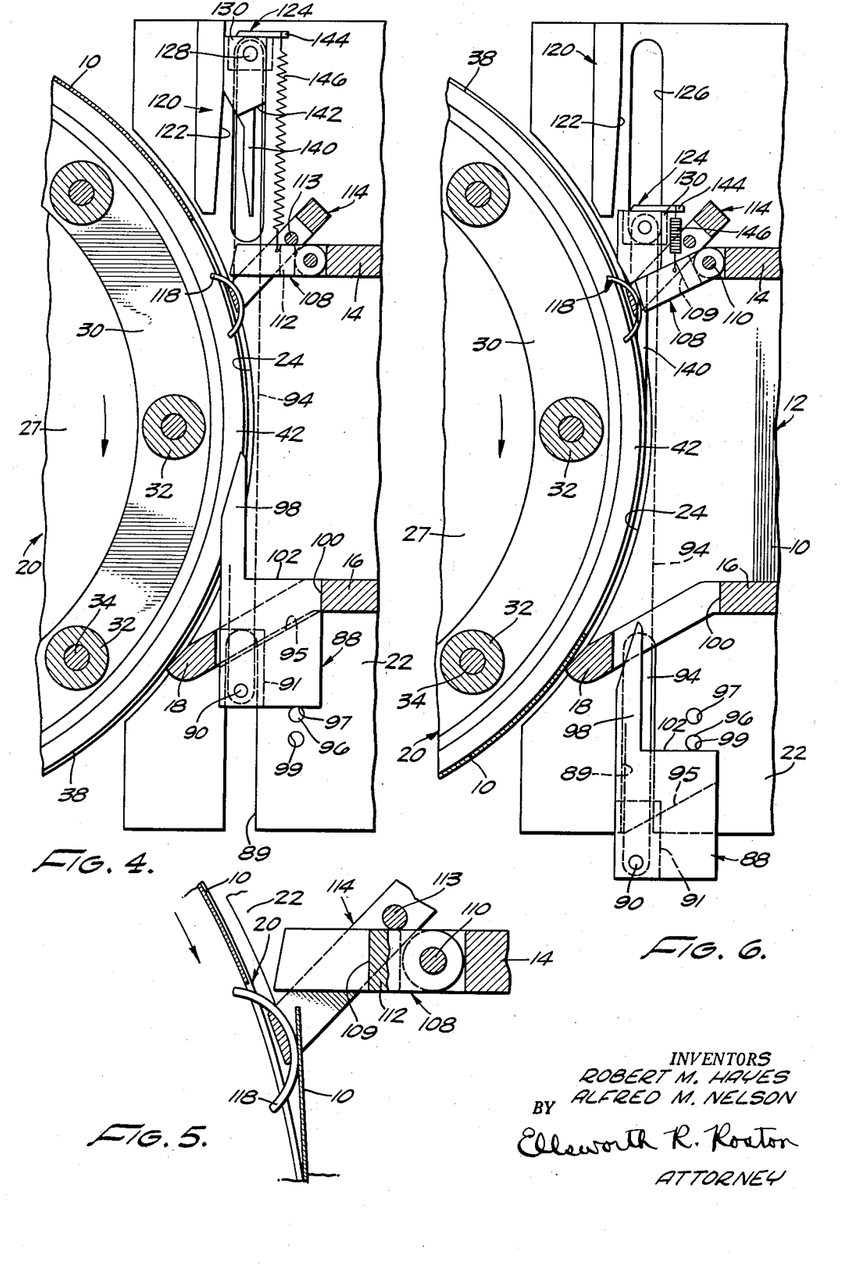
Figure 4 is an enlarged, fragmentary sectional view substantially on the line 4—4 of Figure 3 and illustrates the relative disposition of the drum and the first apparatus shown in Figures 1 and 2 when the apparatus has an operative relationship with the drum corresponding to that shown in Figure 1.
Figure 5 is an enlarged, fragmentary sectional view of certain members in the position of these members shown in Figure 4 and illustrates the operative relationship of these members with respect to the drum and a pair of information cards.
Figure 6 is an enlarged, fragmentary sectional view of the drum and the first apparatus as taken along a line corresponding substantially to the line 4—4 of Figure 3 and illustrates the operative relationship of these members when the apparatus has an operative relationship with the drum corresponding to that shown in Figure 1 for the second apparatus.

In one pivotal position, the retainer 108 in effect forms an extension of the wall 14 (best seen in Figure 4). In a second pivotal position, the retainer 108 is adapted to be disposed in parallel relationship to the wall portion 18 (best seen in Figure 6). A leg 112 is provided on the retainer 108 to prevent any pivotal movement of the retainer in a clockwise direction past a parallel disposition with the wall 14. The leg 112 co-operates with a pin 113 on a guide member generally indicated at 114 to limit the pivotal movement of the retainer in the clockwise direction.

The guide member 114 is fixedly positioned on the table 22 at an oblique angle somewhat more steep than that formed by the wall portion 18. The guide member 114 has a substantially rectangular configuration hollowed as at 116 (best seen in Figure 8) so that the guide member can fit over the retainer 108. Pawls 118 extend from the front wall of the guide member 114 at positions corresponding substantially to the slots 42 in the drum 20. The pawls 118 extend forwardly in a curved configuration from the front wall of the guide member 114 such that the extremities of the pawls are positioned within the periphery of the drum 20 (best seen in Figures 1 and 8).

A support plate generally indicated at 120 extends upwardly from the left end of the plate 22 at a position near the front of the plate. The support plate 120 has a rear surface 122 (Figures 1, 2, 4 and 6) which is tapered in a slightly forward direction with progressive distances toward the right in Figure 2. A control member generally indicated at 124 is disposed against the tapered surface 122 of the support plate 120. The control member 124 is disposed above a slot 126 (Figures 2, 6 and 9) extending in a lateral direction along the table 22 to obtain a variable disposition of the control member on the table.

A stud 128 extends through the control member 124 and the slot 126 into a guide block 130 (Figures 4, 6 and 8) disposed below the table 22 and into the slide bar 94 disposed below the guide block 130. The guide block 130 is slidable in a pair of guide ways 132 (Figure 9) secured to the bottom of the table 22 at opposite sides of the slot 126. A helical torsion spring 134 is supported on the stud 128 and is fastened at one end to the control member 124 and at the other end to the guide block 130.

The control member 124 has a plurality of fingers 140 which extend laterally toward the right in Figure 2. When the control member 124 is disposed at the extreme right position within the slot 126, the fingers 140 extend through the hollow portion 109 of the retainer 108 (best seen in Figure 8) and the hollow portion 116 of the guide member 114. In this disposition of the control member 124, the rear surfaces of the fingers 140 are substantially parallel to the rear surfaces of the fingers 98 and form a substantially continuous line with the rear surfaces of the fingers 98.

A raised portion 142 (Figures 2 and 4) extends upwardly from the top surface of the control member 124. The raised portion 142 extends rearwardly at an oblique angle corresponding substantially to the oblique disposition of the wall portion 18. The raised portion 142 is adapted to contact the retainer 108 and move it to the right in Figure 2 when the control member is moved to the right. Members are also included to pivot the retainer in a clockwise direction when the control member 124 is moved to the left in Figure 2. These members include an arm 144 extending rearwardly from the control member 124 at the left end of the control member in Figure 2 and also include a helical spring 146 attached at opposite ends to the arm 144 and the retainer 108.

Figure 1:
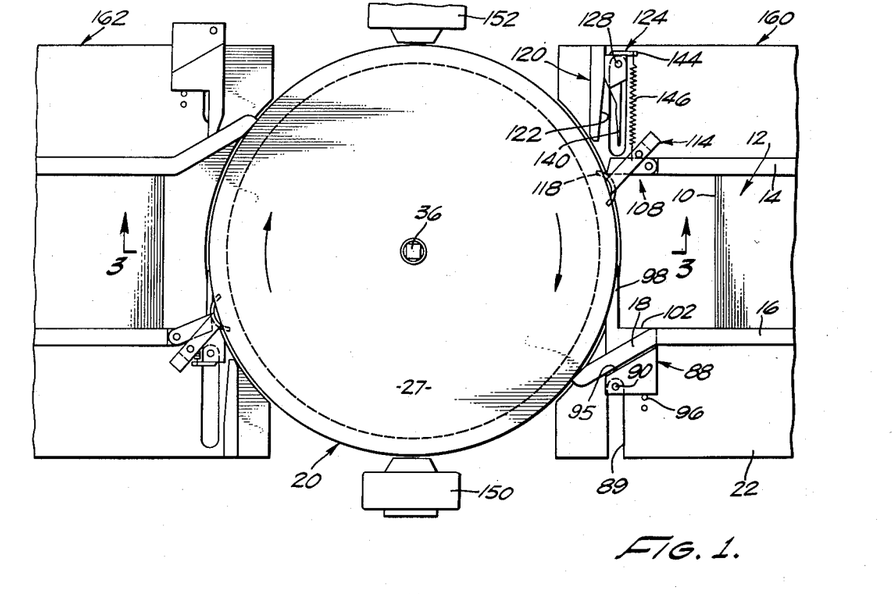
Figure 1 is a top plan view of a rotatable drum, first apparatus disposed on one side of the drum in position for transferring information cards from the drum to a first stack and second apparatus disposed on the other side of the drum in position for transferring the cards from a second stack to the drum.

As shown in Figure 1, a transducing member 150 is disposed in contiguous relationship to the drum 20. Only the transducing member 150 is indicated in Figure 1 but it should be appreciated that any other number of transducing members can be used in accordance with the number of different rows of information on the card 10. The transducing member 150 is disposed in contiguous relationship to the periphery of the drum 20 and is displaced from the apparatus described above in the direction of rotation of the drum. In Figure 1, the transducing member 150 is shown as being displaced in a clockwise direction from the card holder defined by the walls 14 and 16.

In like manner, a transducing member 152 is positioned in Figure 1 in a counterclockwise direction from the card holder defined by the walls 14 and 16. Only the transducing member 152 is shown but other transducing members can be used, especially when each card 10 is provided with a number of different vertical columns of information extending in a lateral direction along the card. The transducing member 152 is disposed in contiguous relationship to the drum 20 in a manner similar to the relationship between the drum and the transducing member 150.

Each of the transducing members such as the members 150 and 152 is provided with magnetic means such as a coil. The coil in each transducing member is so disposed as to be magnetically coupled to the cards 10 during the movement of the cards past the transducing member on the periphery of the drum 20. The transducing members 150 and 152 may be connected to "read" the magnetic indications on the different cards and to convert these magnetic indications into a corresponding pattern of electrical signals. The transducing members 150 and 152 may also be connected to record magnetic information on the cards 10 by converting electrical signals into a corresponding pattern of magnetic signals on the cards.

Since the drum 20 is coupled to the shaft 54, it rotates with the shaft when the shaft is driven by the belt 68 (Figure 3). The housing 60 remains stationary as the shaft 54 rotates because of the operation of the bearings 56 and the conduit 84 also remains stationary since it is push fit into the plate defining the bottom of the housing.

Even though the shaft 54 is rotating relative to the conduit 84, the vacuum pump 86 is able to withdraw air through the continuous passageway formed by the shaft and the conduit. This results from the operation of the disk 78 and the plate 80 in producing a seal at the juncture between the shaft 54 and the conduit 84. The vacuum created by the pump 86 causes air to be withdrawn from the drum 20 through the passageways 46 and the hollow contours of the shaft 54 and the conduit 84. Since the slots 42 communicate with the passageways 46, an inward pressure is created at the periphery of the drum 12 upon the operation of the vacuum pump 86.

Because of the vacuum force exerted by the vacuum pump 86 through the passageways 46 and the slots 42, the cards 10 remain fixedly positioned on the peripheries of the drum 20 as the drum rotates. In this way, the movement of the cards is entirely controlled by the rotational movements of the drum 20. The cards continue their movement on the drum 20 until they travel through the arcuate portion 24 of the table 22 in one position of the apparatus shown in the drawings and described above. In this position of the apparatus, the movement of the cards is arrested by the fingers 98 on the stop 88. This position of the apparatus is best seen in Figures 1, 4 and 5.

The apparatus described above is moved to its position for arresting the movements of the cards 10 on the drum 20 by sliding the bar 94 toward the left in Figure 2. This causes the bar 94 to move the control member 124 toward the left in Figure 2 because of the driving force exerted by the bar on the control member through the guide member 130 and the stud 128 (best seen in Figure 9). As the control member 124 moves toward the left in Figure 2, the spring 146 becomes constrained and acts upon the retainer 108 to pivot it in a clockwise direction. This causes the retainer 108 to be moved into a position forming a planar extension of the wall 14.

The slide bar 94 also acts on the stop 88 through the guide block 91 and the stud 90 to drive the stop 90 toward the left in Figure 2. When the stop 90 has been moved to its extreme left position in Figure 2, the flange 102 in effect forms an extension of the wall 16 and the fingers 98 extend into the slots 42 in the drum 20.

Because of the disposition of the fingers 98 within the slots 42 of the drum 20, the movement of the cards 10 on the periphery of the drum 20 is arrested when the cards reach the fingers. When the cards 10 reach the fingers 98, they continue their movement along the fingers until they reach the flange portion of the stop 88. The cards continue their movement along the fingers 98 because of the tangential relationship between the fingers 98 and the periphery of the drum 20.

As each card 10 reaches the guide member 114, the pawls 118 act upon the card to lift the card from the drum 20. This may be best seen in Figure 5. The card 10 then moves along the pawls 118 and in back of the front wall of the guide member 114. The cards 10 then start to approach the drum 20 after passing the front wall of the guide member 114. One reason is that a vacuum force is exerted through the slots 42 of the drum 20 to press the cards against the drum. In this way, the vacuum force exerted by the pump 86 through the slots 42 acts to grip the card 10 in fixed position on the drum 20 after the card has moved past the pawls 118.

At the instant that the front edge of each card 10 is approaching the flange portion 102 on the stop 88, the rear portion of the card is approaching the pawls 118 on the guide member 114. This causes the rear portion of each card 10 to be lifted from the drum 20 as the front portion of the card becomes impeded by the flange portion 102 on the stop 90. The rear portion of the card 10 remains lifted from the drum 20 while a second card is approaching the guide member 114. This may be seen in Figure 5.

When the front portion of the second card 10 reaches the guide member 114, it becomes lifted from the drum 20 by the pawls 118. This causes the second card to become positioned between the drum and the first card. As the second card continues its movement, it is guided by the pawl 118 back to the drum 20 so as to gradually release the first card from the drum as it approaches the fingers 98. In this way, the first card becomes positioned within a throat portion of the stack holder. This throat portion is defined at opposite ends by the retainer 108 and the flange portion 102 of the stop 90.

In like manner, the rear portion of each card 10 is positioned by the guide member 114 away from the periphery of the drum 20. This causes the next card to become positioned between the first card and the drum 20 as it reaches the pawls 118 on the guide member 114. By this action, the cards become stacked in sequential relationship in the holder defined by the walls 14 and 16. This sequential relationship conforms to the order in which the cards move on the periphery of the drum 20.

It may be desired at a subsequent time to feed the cards to the periphery of the drum 20 from their stacked relationship between the walls 14 and 16. This may be accomplished by moving the various members to second positions. These second positions are reached by sliding the bar 94 (Figures 4 and 6) laterally toward the right in Figure 2. When the bar 94 is moved laterally toward the right, the stop 88 follows the movements of the bar. This causes the fingers 98 to be moved out of the slots 42 in the drum 20. It also causes the fingers 98 and flange portion 102 to be moved out of the slots 100 in the wall portion 18. In this way, the right end of the throat portion forming the opening to the stack becomes defined by the wall portion 18. This may be best seen in Figure 6.

The control member 124 also follows the movements of the slide bar 94 laterally toward the right in Figure 2. As the control member 124 moves laterally toward the right, the torsion spring 134 (Figure 8) acts upon the member to maintain it in abutting relationship with the rear surface 122 (Figures 1, 4 and 6) of the support plate 120. Since the rear surface 122 of the support plate 120 has a forwardly tapered configuration, the torsion spring 134 acts upon the control member 124 to pivot the control member toward the drum 20 as the control member is moved laterally toward the right. This causes the rear surface of the fingers 140 to become positioned in the same plane as the fingers 98 when the control member 124 is moved to its extreme right position. This may be best seen in Figure 6.

As the fingers 140 move laterally toward the right in Figure 2, they enter into the space between the pawls 118 and the near edge of the card 10 contiguous to the pawls. This space may be best seen in Figure 5. By entering into the space between the pawls 118 and the cards 10, the fingers 140 remove the cards from any co-operative relationship with the pawls 118. This causes the cards 10 to rest against the fingers 140 at their end and against the periphery of the drum 20 at an intermediate position.

As the control member 124 moves laterally toward the right in Figure 2, the raised portion 142 of the control member eventually reaches the retainer 108. The raised portion 142 then acts on the retainer 108 to pivot the retainer in a counterclockwise direction to a position substantially parallel to the wall portion 18. This causes the throat portion of the stack 12 to become shifted in the direction of the drum movement. This corresponds to a clockwise direction in Figure 1. The throat portion remains in this adjusted disposition until the bar 94 (Figures 4 and 6) is moved laterally toward the left in Figure 1. The throat portion remains in this adjusted disposition since the guide member 114 is prevented by the control member 124 from pivoting in a clockwise direction. This may be best seen in Figure 6.

When the various members have been positioned in a manner similar to that described in the previous paragraphs, the rear end of the first card in the stack rests against the fingers 140. At an intermediate position of the card, the first card in the stack contacts the periphery of the drum 20. This contacting action is facilitated by the pressure exerted in a forward direction against the first cards by the other cards stacked behind the first card.

Since the first card 10 in the stack contacts the periphery of the drum 20, a frictional force is exerted by the drum against the card to move the card with the drum as the drum rotates. The card is also moved in part by the vacuum force exerted against the card through the slots 42. This vacuum force in effect creates a suction to press the card against the drum for movement with the drum.

The movement of the first card 10 with the drum is also facilitated by the disposition of the card against the fingers 140. This in effect disposes the card in a plane which is tangential to the drum at the position of contact between the card and the drum. By disposing the card in substantially this tangential plane, the card cannot impose any impeding action against its movement by the drum.

As each card 10 moves on the drum 20 toward the apparatus constituting this invention in the stacking position of the apparatus, the card passes the transducing member 152. When the transducing member 152 is adapted to "read" information, signals are induced in the transducing member in accordance with the digital information at successive positions on the card. When the transducing member 152 is adapted to record information on a magnetic basis, fluxes are produced in the card 10 at successive positions in a pattern similar to the pattern of signals introduced to the transducing member.

When the cards are transferred from the stack to the drum 20, the cards move past the transducing member 150. As the cards move past the transducing member 150, information can be either "read" in the transducing member or recorded on the card in a manner similar to that described above for the transducing member 152. Preferably, the transducing member 150 might be performing a reading function when the transducing member 152 is performing a recording function or vice versa.

As shown in Figure 1, a system is provided for obtaining a recirculation of a plurality of cards by using only the drum 20. This may be accomplished by disposing first apparatus on one side of the drum and disposing on the other side of the drum second apparatus similar to the first apparatus. The first apparatus may be generally indicated at 160 and has been described fully above. The second apparatus may be generally indicated at 162.

The apparatus 162 may be in the position of feeding the cards in a sequential pattern to the drum 20. This is the position in which the apparatus 162 is illustrated in Figure 1. When the apparatus 162 is in this position, the apparatus 160 is in the position of receiving the cards in the same order as their movement on the drum. The apparatus 160 is shown in Figure 1 in the position of stacking the cards traveling on the periphery of the drum 20. By such an arrangement, the cards 10 become stacked by the apparatus 160 such that each card is disposed in contiguous relationship to the same cards as in their original disposition in the apparatus 162. However, the cards are stacked by the apparatus 160 in a reverse order relative to their original disposition in the apparatus 162. In like manner, the apparatus 162 may be in the stacking position when the apparatus 160 is in the position of feeding the cards to the drum 20. By alternately varying the dispositions of the apparatus 160 and the apparatus 162 into the stacking and feeding positions, one or more complete recirculations of the cards 10 on the drum 20 can be obtained.

It should be appreciated that the stop 88, the retainer 108 and the control member 124 may be moved independently of one another by removing such components as the slide bar 94. When these various members are moved independently of one another, their movement should preferably follow a certain order. For example, in order to change the apparatus 160 from the card-stacking position shown in Figure 4 to the card-feeding position shown in Figure 6, the control member 124 is preferably moved laterally toward the right in Figure 2 as an initial step. The retainer 108 is then pivoted in a counterclockwise direction and the stop 88 is moved laterally toward the right in Figure 2. The movements of the retainer 108 and the stop 88 may occur simultaneously or either movement may precede the other movement.

Although this application has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. In combination for use with a plurality of cards, means including a drum rotatable in a particular direction for moving the cards with the drum, a card holder disposed in contiguous relationship to the drum for maintaining the cards in stacked relationship, movable means associated with the drum and the card holder in a first position for obtaining an individual withdrawal of the cards from the stack for movement with the drum in the order of their disposition in the stack, and movable means associated with the drum and the stack in a first position for obtaining an individual transfer of the cards from the drum to the stack for disposition in the stack in the order of their movement with the drum.

2. In combination for use with a plurality of cards, a drum rotatable in a particular direction, a stack holder disposed in contiguous relationship to the drum for holding a plurality of cards, means including a first member having a plurality of fingers disposed in one position relative to the drum and to the stack holder for obtaining a transfer of the cards from the drum to the stack holder in the order of their movement with the drum and disposed in a second position out of coupled relationship to the drum and the stack holder, and means including a second member disposed in a first position in co-operative relationship with the drum and the stack holder for facilitating the transfer of cards from the drum to the stack holder and disposed in a second position in co-operative relationship with the drum and the stack holder for facilitating a transfer of the cards from the stack holder to the drum for movement with the drum in the order of their disposition in the stack holder.

3. In combination for use with a plurality of cards, a drum rotatable in a first direction, a holder for retaining the cards in stacked relationship, means including a first member having a plurality of fingers disposed in co-operative relationship with the drum and the card holder in one position of the member for acting upon the cards at their forward end to stop the cards from movement with the drum past the card holder for a transfer of the cards to the card holder, means including a second member having a plurality of fingers disposed in co-operative relationship with the drum and the card holder in one position of the cards at their rear end to facilitate a transfer of the cards from the card holder to the drum for movement with the drum, and means including a third member disposed in one position in co-operative relationship with the drum and the card holder for acting in conjunction with the first member to obtain an orderly and sequential transfer of the cards from the drum to the card holder and disposed in a second position in co-operative relationship with the drum and the card holder for operating in conjunction with the second member to obtain an orderly and sequential transfer of the cards from the card holder to the drum.

4. In combination with a rotatable drum for carrying a plurality of cards on its periphery, a station for retaining a plurality of cards in stacked relationship to one another, means including a first plurality of fingers disposed at one end of the stacking station in the direction of rotation of the drum and movable into contiguous relationship with the drum for inhibiting the movement of the cards past the stacking station to obtain a stacking of the cards and movable out of contiguous relationship with the drum in a second position so as not to interfere with the feeding of the cards from the stacking station to the drum, means disposed in contiguous relationship with the drum and extending into the stacking station for insuring the stacking of the cards in consecutive relationship in accordance with their movement with the drum, and means including the last mentioned means and including means movable into position at the other end of the stacking station to produce a disposition of the cards for facilitating the feeding of the cards from the stacking station to the drum.

5. In combination with a rotatable drum for carrying a plurality of cards on its periphery, a station for retaining a plurality of cards in stacked relationship to one another and having an adjustable throat portion for receiving or feeding the cards, means disposed at the far end of the throat portion in the direction of rotation of the drum for inhibiting the movement of the cards with the drum past the throat portion in one position of the inhibiting means to obtain a stacking of the cards in the station and for providing an adjustment in the position of the throat portion in a second position of the receiving means, means movable into a first position during the stacking operation to provide a particular width to the throat member in accordance with the dimensions of the cards and movable into a second position during the feeding operation to maintain the dimensions of the throat portion upon the adjustment in the position of the throat portion, and means movable from a position out of coupling with the cards during the stacking operation and movable into a position at the near end of the throat portion in the direction of rotation of the cards for holding the cards in position for facilitating the feeding of the cards in a sequential pattern to the drum.

6. In combination with a rotatable drum for carrying a plurality of cards on its periphery, means for providing a stacking station having an adjustable throat portion for receiving the cards in the stacking position and for transferring the cards to the drum in the feeding position, a first member having fingers disposed in contiguous relationship to the periphery of the drum in one position of the member to remove the cards from the drum for stacking in the station and having a portion disposed within the throat portion in the first position of the member to provide a first disposition of the throat position and removable from the throat portion in a second position of the member to provide an adjusted disposition of the throat portion, a second member pivotable in one position to provide in the stacking station a throat portion having particular dimensions dependent upon the dimensions of the cards and pivotable into a second position to obtain a throat portion having substantially the particular dimensions in the adjusted disposition of the throat portion, and a third member having fingers movable into a position having a co-operative relationship with the second member in the second position of the second member for positioning the cards in the adjusted position of the throat member to facilitate the withdrawal of the cards by the drum from the stacking station.

7. In combination for controlling the movement of a plurality of cards, a rotatable drum having a plurality of slots in its periphery for holding the cards by the creation of a vacuum force on the cards, a pivotable first member, a station for holding a plurality of cards in stacked relationship and having a first wall defined by the pivotable first member, a second member having a first portion disposed in co-operative relationship with the first member in first positions of the members to form a throat portion and having fingers for disposition in the slots of the drum in the first position of the member to provide for the transfer of the cards from the drum to the throat member and movable to a second position out of co-operative relationship with the drum and the first member, the first member being pivotable into a second position to provide with the walls of the station an adjusted position of the throat portion upon the movement of the second member into the second position, and a third member disposed in co-operative relationship with the first member in a first position of the third member and in the second position of the first member and having fingers for positioning the cards in the first position of the member to facilitate the transfer of the cards from the station to the drum and movable in a second position out of co-operative relationship with the drum and the first member.

8. In combination for use with a plurality of cards, a drum rotatable in a particular direction and having a plurality of peripheral slots for the creation of a vacuum force for holding the cards in fixed position on the drum during drum rotation, a stacking station defined by a pair of opposite walls and having an adjustable throat portion in contiguous relationship to the walls, means including a first member pivotable into a first position for providing with one of the walls a first disposition of the throat member in a retarded position in the direction of drum rotation and pivotable into a second position in a direction opposite to the direction of drum rotation, means including a second member having a first portion movable into a first position to co-operate with the first member in the second position of that member for a second disposition of the throat member in an advanced position in the direction of drum rotation and having a plurality of fingers extending into the slots of the drum in the first position of the member to prevent the cards from moving with the periphery of the drum past the fingers for a movement of the cards into the throat portion of the stack, means including a third member disposed in the throat portion at an advanced position in the direction of drum rotation and having a plurality of pawls for separating the cards from the periphery of the drum during their movement with the drum past the member to facilitate the stacking operation and to obtain a stacking of the cards in a logical sequence in accordance with the movement of the cards with the drum, and means including a fourth member having a portion extending in one position into the throat portion in the retarded position of the throat portion in the direction of drum rotation to hold the cards in a relationship to the drum for facilitating the feeding of the cards in sequence from the stacking station to the drum.

9. In combination for use with a plurality of cards, a drum rotatable in a particular direction, a holder for retaining the cards in stacked relationship, means including a first member pivotally disposed in a first position to provide with the holder a throat portion for holding the cards in a feeding position and pivotally disposed in a second position at a position advanced in the direction of drum rotation, means including a second member having a first portion disposed in a first position to form a throat portion with the first member in the second position of the first member for holding the cards in a stacking position and having a plurality of fingers extending into contiguous relationship with the drum at a position retarded in the direction of drum rotation to remove the cards from the drum for stacking in the station, means including a third member disposed in contiguous relationship to the drum at an advanced position in the direction of drum rotation for lifting the cards from the drum during their movement towards the throat portion to facilitate the stacking of the cards in a logical sequence in the station, and means including a fourth member having a plurality of fingers disposed in the throat portion in the feeding position of the throat portion and disposed at an advanced position in the direction of drum rotation to position the cards for an enhancement of the feeding of the cards from the station to the drum.

10. In combination for use with a plurality of cards, a drum rotatable in a particular direction, a first stack holder disposed in contiguous relationship to the periphery of the drum at one peripheral position along the drum for holding the cards, a second stack holder disposed in contiguous relationship to the periphery of the drum at another peripheral position along the drum for holding the cards, means associated with the drum and the first stack holder for obtaining an individual withdrawal of the cards from the stack for movement with the drum in accordance with their disposition in the stack, means associated with the drum and the second stack holder for obtaining an individual transfer of the cards from the drum to the stack holder for disposition in stacked relationship in accordance with the movement of the cards with the drum, means associated with the drum and the second stack holder for obtaining an individual withdrawal of the cards from the stack for movement with the drum in accordance with their disposition in the stack, and means associated with the drum and the first stack holder for obtaining an individual transfer of the cards from the drum to the stack holder for disposition in stacked relationship in accordance with the movement of the cards with the drum.

11. In apparatus as set forth in claim 3, a second holder for retaining the cards in stacked relationship, and means including first, second and third members associated with the drum and the second card holder and corresponding to the first, second and third members associated with the drum and the first card holder for obtaining a transfer of cards from the first card holder to the drum and then to the second card holder or for obtaining a transfer of cards from the second card holder to the drum and then to the first card holder.

12. In combination for use with a plurality of cards, means including transport means movable in a closed loop for holding the cards in fixed positioning on the periphery of the transport means during the movement of the transport means, a stack holder disposed in coupled relationship to the drum and having a pair of walls for holding the cards, at least one pawl disposed in cooperative relationship with the transport means between the walls of the stack holder for facilitating the transfer of cards from the periphery of the transport means to the stack holder in the same order as the movement of the cards with the transport means, first means including a first member movable into coupled relationship with the transport means and cooperative with the pawl in the coupled relationship with the transport means to obtain the transfer of cards from the periphery of the transport means to the stack holder in the same order as the movement of the cards with the transport means, and second means including a second member movable into coupled relationship with the transport means for obtaining a transfer of cards from the stack holder to the periphery of the transport means in the same order as the disposition of the cards in the stack holder.

13. A combination as set forth in claim 12 in which the transport means is a rotatable drum and in which the extremities of the pawl are disposed in cooperative relationship with the periphery of the drum to obtain a transfer of cards from the periphery of the drum and a subsequent transfer of the cards to the periphery of the drum when the first means are not in a cooperative relationship with the drum.

14. In combination for use with a plurality of cards, means including transport means movable in a closed loop for holding the cards in fixed positioning on the periphery of the transport means during the movement of the transport means, a stack holder for holding the cards in stacked relationship, means including a first member movable to a first position out of coupled relationship with the transport means and movable to a second position in coupled relationship with the transport means for obtaining a transfer of cards from the periphery of the transport means to the stack holder, and means including a second member movable to a first position in coupled relationship with the transport means for obtaining a transfer of cards from the stack holder to the periphery of the transport means and movable to a second position out of coupled relationship with the transport means.

15. A combination as set forth in claim 14 in which means are included for obtaining coordinated movements of the first means and the second means to the first positions at particular times for a transfer of cards from the transport means to the stack holder and for obtaining coordinated movements of the first means and the second means to the second positions at other times for a transfer of cards from the stack holder to the transport means.

16. A combination as set forth in claim 14 in which transducer means are disposed in contiguous relationship to the transport means to process signal information disposed on the cards.

17. A combination as set forth in claim 14 in which the transport means is a rotatable drum constructed to receive a vacuum force at the periphery of the drum for holding the cards in fixed position on the periphery of the drum during the drum movement, in which transducer means are disposed in contiguous relationship to the drum to process signal information disposed on the cards and in which means are included for obtaining coordinated movements of the first means and the second means to the first positions at particular times for a transfer of cards from the transport means to the stack holder and for obtaining coordinated movements of the first means and the second means to the second positions at other times for a transfer of cards from the stack holder to the transport means.

18. In combination for use with a plurality of cards each having a plurality of signal indications, means including transport means movable in a closed loop for holding the cards in fixed positioning on the transport means during the movement of the transport means, a stack holder disposed in contiguous relationship to the transport means for holding the cards in stacked relationship, first means including a first member movable to a first position out of coupled relationship with the transport means and movable to a second position in coupled relationship with the transport means and the stack holder for obtaining a transfer of cards from the transport means to the stack holder, second means including a second member movable to a first position in coupled relationship with the transport means and the stack holder for obtaining a transfer of cards from the stack holder to the transport means and movable to a second position out of coupled relationship with the transport means, the second member being disposed in the first position for a recirculation of the cards with the transport means through one or more loops on the transport means, transducing means disposed in contiguous relationship to the transport means for processing the signal indications on the cards moving with the transport means, and means for providing a coordinated movement of the first and second members to the first positions at particular times and to the second positions at other times.

19. The combination as set forth in claim 12 in which a second stack holder, a second pawl, third means including a third movable member and fourth means including a fourth movable member respectively correspond to and are displaced from the first stack holder, the first pawl, the first means including the first movable member and the second means including the second movable means to obtain a transfer of cards by the transport means from the first stack holder to the second stack holder or from the second stack holder to the first stack holder.

References Cited in the file of this patent
UNITED STATES PATENTS
2,522,226  Hood _________________ Sept. 12, 1950